United States Patent [19]

Evans

[11] Patent Number: 4,722,404
[45] Date of Patent: Feb. 2, 1988

[54] DRILL BIT BEARING SEAL

[75] Inventor: Robert F. Evans, Dallas, Tex.

[73] Assignee: Varel Manufacturing Company, Dallas, Tex.

[21] Appl. No.: 7,568

[22] Filed: Jan. 28, 1987

[51] Int. Cl.$^4$ ............................................. E21B 10/22
[52] U.S. Cl. ..................... 175/371; 277/95; 277/235 R
[58] Field of Search ................. 175/371, 372; 277/95, 277/96, 235 R, 81 R

[56] References Cited

U.S. PATENT DOCUMENTS

| 3,096,835 | 7/1963 | Neilson | 175/371 |
|---|---|---|---|
| 3,137,508 | 6/1964 | Cunningham | 277/95 |
| 3,199,878 | 8/1965 | Cunningham et al. | 175/371 |
| 3,370,895 | 2/1968 | Cason, Jr. | 277/95 |
| 3,381,968 | 5/1968 | Neilson | 277/95 |
| 3,489,421 | 1/1970 | Neilson | 277/95 |
| 4,330,134 | 5/1982 | Kolinger | 277/95 |
| 4,359,111 | 11/1982 | Gonzalez | 175/372 |
| 4,516,641 | 5/1985 | Burr | 175/372 |
| 4,560,175 | 12/1985 | Kar | 277/92 |
| 4,610,452 | 9/1986 | DiRienz | 277/95 |

FOREIGN PATENT DOCUMENTS

| 2736711 | 3/1978 | Fed. Rep. of Germany | 175/372 |
|---|---|---|---|
| 2071739 | 9/1981 | United Kingdom | 175/372 |

Primary Examiner—James A. Leppink
Assistant Examiner—Terry Lee Melius
Attorney, Agent, or Firm—Harold E. Meier

[57] ABSTRACT

The invention includes a low-friction seal assembly for use with a rotary drill bit having bit cutters manufactured by casting. The seal assembly includes a seal element having a bellville spring element surrounded by an elastomeric material. The seal element is secured for rotation with the bit cutter by pitted surfaces of a securing groove formed in the cutter, adhesive, and/or by roughening the surface of the bit cutter contacting the seal element.

8 Claims, 6 Drawing Figures

DRILL BIT BEARING SEAL

TECHNICAL FIELD

This invention relates to bearing seals and, in particular, to a bearing seal which experiences minimal frictional wear.

BACKGROUND AND SUMMARY OF THE INVENTION

A common drill bit used in the exploration and recovery of oil, water and the like to bore through earth formations is the rotary drill bit. In use, the rotary drill bit is secured to the lower end of a string of drill pipe which rotates and urges the drill bit against the underlying earth formation. The drill bit includes a drill bit body and a number of conical rock bit cutters rotatably supported by bearings at the lower pin end of the bit body.

As the drill bit is rotated, the bit cutters bore into the underlying earth formation. Extending radially from each bit cutter are a number of teeth, each having a tip made of diamond or metal that is harder than the underlying earth formation. The bit cutters essentially rolls across the underlying earth formation as the bit rotates, causing the teeth extending from the cutter to create a bore hole by impacting and pulverizing the formation. At the same time, drilling mud is pumped through the drill string and bit body, around the bit cutters, to cool the cutters, lubricate exterior surfaces of the bit and sweep fragments of the pulverized formation from the cutters back to the surface through the space surrounding the drill string and drill bit.

The bearings supporting the rock bit cutter are protected by bearing seals from the highly abrasive mixture of drilling mud and cuttings, which would otherwise quickly destroy the bearings. Typically, bearing seals comprise an O-ring or a bellville spring covered with an elastomeric material. The seal is positioned about the bearing and compressed between the bearing surfaces of the pin end of the bit body and the bearing surfaces of the bit cutter to form a barrier against intrusion of drilling mud and cuttings.

In an effort to extend the service life of such bearing seals in the past, both the bit body and the bit cutter have been manufactured from high quality metals, such as forgings and rolled bar stock. This has allowed the bearing surfaces of the bit body and the bit cutter between which the bearing seal is compressed to be machined to a smooth finish. As the bit cutter rotates during drilling, the bearing seal can slide across the bearing surfaces of the pin end of the bit body and the bit cutter without significant frictional wear.

Unfortunately, use of forgings and rolled bar stock to manufacture the bit cutter is relatively costly. For example, each bit cutter must be machined entirely from a forging or rolled bar stock. The teeth of each cutter are then formed individually. Such machining procedures alone are costly. In addition, the initial cost of forgings and rolled bar stock is relatively great.

The present invention overcomes the foregoing disadvantages by providing a bearing seal that can be used with bit cutters, and other components, manufactured by casting, a relatively quick and inexpensive procedure. Use of cutters manufactured by casting has not been practical due to voids routinely formed during manufacture. As a result of such voids, a smooth surface for engaging the bearing seal cannot be machined on the bearing surfaces. Instead, the voids cause pits to form along the machined surface. Frictional wear of the bearing seal by the pitted surface of the cutter, such as scuffing and abrasion, reduces service life of the seal beyond acceptable limits.

The present invention includes a bearing seal for use with bit cutters, or other rotary components, manufactured by casting. In a rotary drill bit, for example, the seal assembly includes a resilient seal element placed about the bearing surfaces and compressed between the bit cutter and the pin end of the body. The seal element is secured for rotation with the bit cutter to avoid frictional wear which would otherwise be caused by the pitted surface of the bit cutter. The seal element is secured to the cutter in a number of ways, including by use of an annular groove into which the seal element is assembled and/or a suitable adhesive. If the seal element includes an elastomeric surface which abuts the bit cutter, the element may be secured to the cutter frictionally by engagement of the elastomeric surface with the pitted surface of the bit cutter. If desired, the surface of the bit cutter contacting the seal element is roughened to further secure the seal element for rotation with the bit cutter.

In another aspect of the invention, means are provided for reducing wear of the seal element by the bearing surface of the bit body. If desired, the seal element is provided with a metallic finish which engages the bit body. In this instance, the body may also be provided with a replaceable metallic inlay in contact with the abutting metallic surface of the seal element. In the alternative, the bit body is provided with a non-metallic, low-friction inlay which contacts the seal element to minimize frictional wear.

BRIEF DESCRIPTION OF THE DRAWINGS

A more complete understanding of the invention may be had by reference to the following Detailed Description when taken in conjunction with the Drawings, wherein.

DETAILED DESCRIPTION

Figure 1:
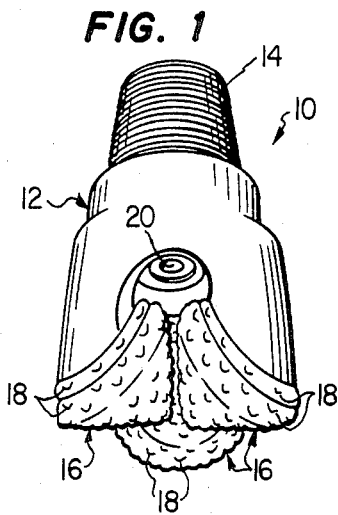
FIG. 1 is a perspective view of a typical rotary drill bit.

Referring to FIG. 1, there is shown a rotary drill bit 10 for drilling a bore hole through earth formations. The drill bit 10 includes a bit body 12 having an upper threaded portion 14 for securing the drill bit 10 to a string of drill pipe (not shown). Rotatably supported at the lower end of the drill bit 10 are bit cutters 16, each having a number of cutting teeth 18 for pulverizing an underlying formation during drilling. A channel 20 extends through the bit body 12 for supplying drilling mud from the pipe string to the bit cutters 16 during drilling.

Figure 2:
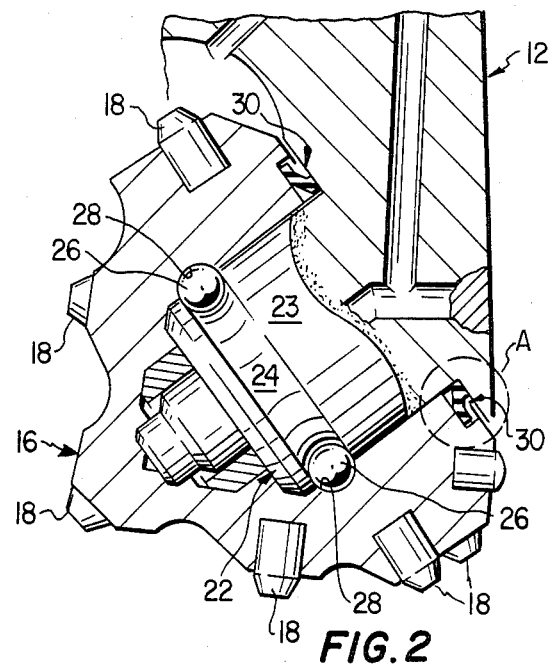
FIG. 2 is a partial sectional side view of the rotary drill bit shown in FIG. 1, illustrating a bit cutter, bearing assembly, seal assembly and a portion of the bit body.

FIG. 2 is a partial sectional side view of the rotary drill bit 10, illustrating in detail the support of one of the bit cutters 16 on the pin end of the bit body 12. The bit cutter 16 is supported on the pin end for rotation by means of a bearing assembly 22. The bearing assembly 22 includes a spindle 23 having a ball retaining groove 24 formed about its perimeter for containing a number of retaining balls 26. A corresponding retaining groove 28 is formed about the interior surface of the bit cutter 16 also for containing the retaining balls 26. The bit cutter 16 is supported for rotation on the bearing assembly by the retaining balls 26 which roll across the surfaces of the retaining grooves 24 and 28 as the bit cutter 16 rotates. The bearing assembly 22 is protected from drilling mud and cuttings during drilling operations by a seal assembly 30 interposed between the bit body 12 and the bit cutter 16.

Figure 3:
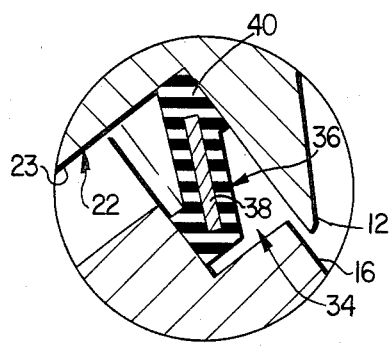
FIG. 3 is a magnified view of a portion of the rotary drill bit shown in FIG. 2 enclosed by a broken circle A, illustrating a prior art seal assembly.

FIG. 3 is a magnification of that area of the drill bit 10 of FIG. 2 within a broken circle A, illustrating a typical prior art seal assembly 34. The seal assembly 34 includes a seal element 36 comprising a metallic bellville spring 38 is surrounded by an elastomeric material 40, such as rubber. The seal assembly 34 is compressed between the bit body 12 and the bit cutter 16, causing deformation of the bellville spring 38. This, in turn, causes compression of the elastomeric surface of the seal assembly 34 against the bearing surface of the bit body 12 and bit cutter 16 to provide a fluid-tight seal.

The prior art seal assembly 34 is not secured to either the bit body 12 or the bit cutter 16, but is allowed to rotate freely with respect to the body 12, bearing assembly 22 and cutter 16 during operation of the drill bit 10. To minimize frictional wear of the seal assembly 34, the surfaces of the bit body 12, bearing assembly 22 and bit cutter 16 contacting the seal element 36 must all be machined to a smooth finish.

As previously discussed, to provide a smooth surface, the bit body 12 is manufactured from a forging or rolled bar stock, since such materials generally are free of voids that would cause any machined bearing surface of the bit body to be pitted. Therefore, use of the prior art seal assembly 34 necessitates manufacture of not only the entire bit body 12 by machining, but also requires that the bearing surfaces of the bit cutter 16 be manufactured by machining, as shown in FIG. 2.

Figure 4:
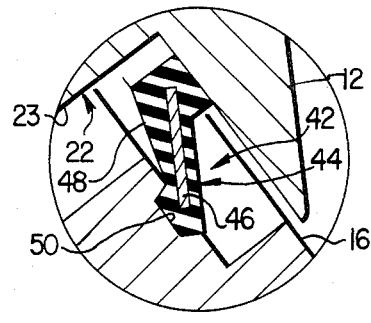
FIG. 4 is a magnified view of a portion of the rotary drill bit shown in FIG. 2 enclosed by a broken circle A, illustrating a seal assembly incorporating a first embodiment of the present invention.

FIG. 4 illustrates a seal assembly 42 comprising a first embodiment of the invention, for use with a bit cutter 16 manufactured by a casting process. The seal assembly 42 comprises a seal element 44 including a metallic bellville spring 46 surrounded by an elastomeric material 48, such as rubber. The seal assembly 42 is compressed between the bearing surfaces of the bit body 12 and the bit cutter 16 to seal the bearing surfaces from drilling mud and cuttings surrounding the drill bit 10 during drilling.

In contrast with the prior art device shown in FIG. 3, the seal assembly 42 of FIG. 4 is secured to and rotates with the bit cutter 16 during operation. This is accomplished by forming an annular securing groove 50 on the surface of the bit cutter 16.

The securing groove 50 has a keystone-shaped cross section. The securing groove 50 engages or mates with a keystone-shaped portion of the seal element 44, creating a high-friction bond preventing slippage of the seal element 44 over the surface of the bit cutter. Rotation of the seal element 44 with the bit cutter 16 minimizes frictional wear of the seal element 44 by the cast surface of the bit cutter 16, such as by scuffing or abrasion. The bit body 12 is manufactured from a forging or rolled bar stock to allow maching to a smooth finish the surfaces in contact with the seal element 44. This minimizes frictional wear of the seal element 44 as it slides over the surface of the bit body during rotation of the bit cutter.

Frictional wear of the seal assembly 42 of FIG. 4 is reduced in comparison to the prior art assembly of FIG. 3 as a result of the keystone-shaped portion spacing the seal element 44 from the surface of the bearing assembly 22. This is accomplished by manufacturing the seal element 44 with an inner diameter larger than the diameter of the spindle 23 of the pin end of the bit body. The seal element is centered about and held from contact with the spindle 23 by the securing groove 50.

Manufacture of the bit cutter 16 by casting aids in securing the seal element 44 against rotation relative to the bit cutter. As previously discussed, casting forms small voids throughout the bit cutter and it is these voids that aid in securing the seal element against rotation. When the securing groove 50 is formed, voids in the bit cutter 16 form pits along the surface of the groove 50. Such pits engage the elastomeric material 48 of the seal element 44 to assist in preventing slippage of the seal element 44 over the surface of the cutter.

The seal element 44 is further secured to the bit cutter 16 by means of a suitable adhesive or by roughening the surface of the bit cutter 16 contacting the seal element 44 to provide a greater frictional bond. It will be apparent that such methods may be used together, singlely, or separately in combination with the securing groove 50, as desired.

Figure 5:
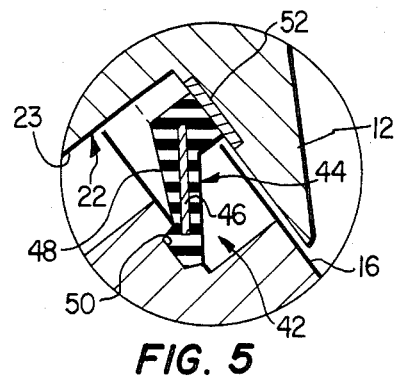
FIG. 5 is a magnified view of a portion of the rotary drill bit shown in FIG. 2 enclosed by a broken circle A, illustrating a seal assembly incorporating a second embodiment of the present invention.

FIG. 5 illustrates a second embodiment of the invention. Numerous components of this embodiment are substantially identical in construction and operation to the embodiment of FIG. 4 and identified by the same reference numeral. The embodiment of FIG. 5, however, differs from the embodiment of FIG. 4 in that wear rings are provided for reducing friction, and associated wear, between the surfaces of the seal element 44 and the bit body 12.

Specifically, the bit body 12 includes an annular inlay 52 manufactured from a wear-resistant, low-friction material, such as Teflon, nylon and the like. The inlay surrounds the spindle 23 and provides a low-friction surface over which the seal element 44 slides as the bit cutter 16 rotates. Use of the inlay 52 increases the service life of the seal assembly 44 by minimizing frictional wear of the surface of the seal element abutting the drill head 12.

Figure 6:
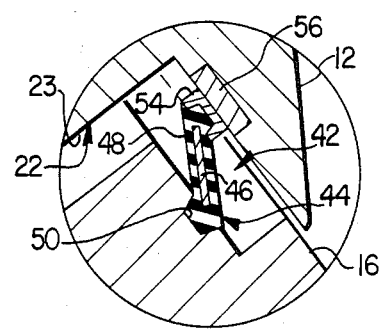
FIG. 6 is a magnified view of a portion of the rotary drill bit shown in FIG. 2 enclosed by a broken circle A, illustrating a seal assembly incorporating a third embodiment of the present invention.

FIG. 6 illustrates a third embodiment of the invention. Numerous components of the embodiment are substantially identical in construction and operation to those in FIGS. 4 and 5 and identified by the same refernce numeral. The embodiment of FIG. 6 is, however, distinguishable from the embodiment of FIGS. 4 and 5 in that the seal assembly 44 is adapted for use in high-speed and high-temperature applications.

Specifically, the embodiment of FIG. 6 includes a seal element 44 having a metallic wear ring 54. The wear ring includes a flat surface having a smooth finish which abutts the bit body 12. The body 12 includes an annular metal inlay 56 providing a bearing surface over which the wear ring 54 of the seal element 44 slides as the bit cutter 16 rotates. The metal inlay 56 has a smooth finish to allow the wear ring 54 of the seal element 44 to seal the bearing assembly 22 against the entry of drilling mud, cuttings and the like. Preferably, the metal inlay 56 is removable, to allow periodic replacement if needed due to wear caused by the wear ring 54.

Although preferred embodiments of the invention have been illustrated in the accompanying Drawings and described in the foregoing Detailed Description, it will be understood that the invention is not limited to the embodiments to the invention disclosed but is capable of numerous rearrangements, modifications and substitutions of parts and elements without departing from the spirit of the invention.

I claim:

1. A rotary cone rock bit, comprising:
   a bit body including at least one journal pin having a sealing surface forming one part of a sealing groove and a bearing surface for rotatably supporting a bit cutter;
   a cast bit cutter rotatably mounted on the bearing surface said cutter having roughened surfaces including a roughened sealing surface with pit-like imperfections, said roughened sealing surface positioned with reference to the sealing surface of said bit body to form a second part of the sealing groove therebetween;
   a seal interposed between the sealing surface of the bit body and the roughened sealing surface of the bit cutter for sealing the bearing surface supporting the bit cutter; and
   said seal having an elastomeric surface engaging the pit-like imperfections of the roughened sealing surface of the cast bit cutter to secure the seal to the cutter against rotation to minimize frictional wear caused by slippage of the seal over the sealing surface of the cutter.

2. The rotary drill bit of claim 1 wherein the cast bit cutter includes a securing groove formed in the sealing surface of the bit cutter to engage a portion of the seal.

3. The seal assembly of claim 2 wherein the groove formed into the bit cutter and the portion of the seal element secured by the groove have cross sections that are keystone-shaped, to minimize slippage of the seal element within the groove.

4. The rotary drill bit of claim 1 wherein the seal includes a bellville spring which surrounds the journal pin and urges the seal against the sealing surface both the bit cutter and the bit body.

5. The rotary drill bit of claim 1 wherein the bit body includes a low friction, non metallic surface abutting the seal to minimize frictional wear of the seal as the bit cutter rotates.

6. The rotary drill bit of claim 1 wherein the seal includes an elastomeric surface abutting the bit cutter and a metallic surface abutting the bit body to minimize frictional wear of the seal as the bit cutter rotates.

7. The drill bit of claim 6 wherein the bit body includes a metallic inlay abutting the metallic surface of the seal.

8. The seal assembly of claim 1 including an adhesive for securing the seal element to the bit cutter.

* * * * *

UNITED STATES PATENT AND TRADEMARK OFFICE
CERTIFICATE OF CORRECTION

PATENT NO. : 4,722,404

DATED : February 2, 1988

INVENTOR(S) : Robert F. Evans

It is certified that error appears in the above-identified patent and that said Letters Patent is hereby corrected as shown below:

Column 3, line 29, after "38" insert -- which is rubberized; that is the bellville spring 38 --.

Column 4, line 10, change "maching" to "machining".

Column 6, line 19, after "surface" insert -- of --.

Column 6, line 22, after "non" insert -- - --.

Signed and Sealed this

Twelfth Day of July, 1988

Attest:

DONALD J. QUIGG

Attesting Officer

Commissioner of Patents and Trademarks